United States Patent [19]

Sakai et al.

[11] Patent Number: 4,684,711

[45] Date of Patent: Aug. 4, 1987

[54] PROCESS FOR PRODUCING A HYDROCARBON RESIN

[75] Inventors: Yasushi Sakai; Koji Tanaka; Michio Saito; Akio Kiyohara, all of Yokkaichi, Japan

[73] Assignee: Toyo Soda Manufacturing Co., Ltd., Shin-nanyo, Japan

[21] Appl. No.: 828,689

[22] Filed: Feb. 12, 1986

[30] Foreign Application Priority Data

Mar. 6, 1985 [JP] Japan .................................. 60-42864

[51] Int. Cl.$^4$ .............................................. C08G 65/38
[52] U.S. Cl. ...................................... 528/86; 528/212; 528/217; 525/334.1; 525/371; 525/384; 525/385
[58] Field of Search ........................ 528/86, 212, 217; 525/334.1, 371, 384, 385

[56] References Cited

U.S. PATENT DOCUMENTS 2,349,759  2/1942  Reiff et al. .......................... 528/86

*Primary Examiner*—Morton Foelak
*Assistant Examiner*—M. L. Moore
*Attorney, Agent, or Firm*—Oblon, Fisher, Spivak, McClelland & Maier

[57] ABSTRACT

A process for producing a hydrocarbon resin which comprises polymerizing, by means of a Friedel-Crafts catalyst, a mixture of (1) a residual fraction obtained by polymerizing a fraction of a boiling point range of from 140° to 280° C. obtained from the decomposition of a petroleum and containing unsaturated hydrocarbons and removing the resulting polymer and (2) phenol and/or a phenol derivative.

9 Claims, No Drawings

PROCESS FOR PRODUCING A HYDROCARBON RESIN

FIELD OF THE INVENTION

The present invention relates to a process for producing a hydrocarbon resin which is liquid at room temperature. More particularly, the present invention relates to a process for producing a liquid hydrocarbon resin by using a residual hydrocarbon fraction obtained by polymerizing an unsaturated hydrocarbon-containing fraction obtained by the thermal decomposition or catalytic decomposition of a petroleum and removing the resulting polymer therefrom, and phenol and/or a phenol derivative (hereinafter referred to as a "phenol compound").

DESCRIPTION OF THE PRIOR ART

Hydrocarbon resins are used as extenders or a part of modifiers for epoxy resins and urethane resins. It is common that these hydrocarbon resins are modified with polar groups such as hydroxyl groups to improve their compatibility with such resins. However, such modified hydrocarbon resins are solid, and when they are used as extenders, other expensive diluents are required to accomplish the desired object, thus offsetting their contribution to the cost down. Further, when such diluents are incorporated, there will be a problem such as evaporation of solvents, which is undesirable from the view point of the safety and hygiene.

Further, a xylene resin is used as an extender and diluent for epoxy resins. However, if the xylene resin is used in a substantial amount, the physical properties of the epoxy resins such as the bending strength, compressive strength or tensile strength, deteriorate substantially. Therefore, the amount of its use is restricted. Furthermore, in recent years, it has been proposed to use a liquid cumarone resin or a petroleum resin as a tackifier for rubbers or as an oligomer for blending into coating materials.

SUMMARY OF THE INVENTION

An object of the present invention is to provide a process for producing a liquid hydrocarbon resin, of which the compatibility with e.g. epoxy resins is improved by introducing phenolic hydroxyl groups into the hydrocarbon resin and which is capable of minimizing the deterioration of the physical properties when used as an extender, and which is also useful as a diluent.

The present invention provides a process for producing a hydrocarbon resin which comprises polymerizing, by means of a Friedel-Crafts catalyst, a mixture of (1) a residual fraction obtained by polymerizing a fraction of a boiling point range of from 140° to 280° C. obtained from the decomposition of a petroleum and containing unsaturated hydrocarbons and removing the resulting polymer and (2) a phenol compound (i.e. phenol and/or a phenol derivative).

DETAILED DESCRIPTION OF THE PREFERRED EMBODIMENTS

The starting materials for the hydrocarbon resin to be used in the present invention are an unreacted fraction containing unsaturated hydrocarbons remaining after the production of a resin containing mainly aromatic hydrocarbons by polymerizing, by thermal polymerization or in the presence of a catalyst, a fraction of a boiling point range of from 140° to 280° C. obtained by e.g. the thermal decomposition or catalytic decomposition of a petroleum, and a phenol compound. Usually, the unsaturated hydrocarbons contained in the fraction of a boiling point range of from 140° to 280° C., are mainly aromatic hydrocarbons having 9 carbon atoms. According to the present invention, these unsaturated hydrocarbons are polymerized and removed, and it is the feature of the present invention to use the residual fraction containing polymerizable unsaturated hydrocarbons and a phenol compound as starting materials. The amount of the remaining polymerizable unsaturated hydrocarbons in the residual fraction to be used in the present invention is from 5 to 30% by weight, preferably from 5 to 20% by weight. If the amount exceeds 30%, it becomes difficult to produce a resin which is liquid at room temperature. The amount of the polymerizable unsaturated hydrocarbons in the residual fraction may be adjusted by controlling the polymerization yield and the treating conditions for separating the unreacted fraction in the preceding step.

In the present invention, the phenol compound is used in an amount of from 10 to 50 parts by weight relative to 100 parts by weight of the residual fraction containing unsaturated hydrocarbons as the above-mentioned starting material. If the phenol compound is less than 10 parts by weight, the viscosity of the resin obtainable by polymerization tends to be very high at room temperature, or in some cases, the resin tends to be solid, thus being undesirable as a diluent. On the other hand, if the phenol compound exceeds 50 parts by weight, the polymerization yield sharply drops, such being undesirable.

The phenol compound to be used in the present invention includes phenol and an alkylphenol such as cresol, xylenol, ethylphenol, isopropylphenol, tert-butylphenol, tert-octylphenol or nonylphenol.

As the Friedel-Crafts catalyst to be used in the present invention, there may be mentioned usual catalysts, for instance, an aluminum halide such as anhydrous aluminum trichloride, or its complex, boron trifluoride or its complex and a tin halide such as tin tetrachloride. Preferred is anhydrous aluminum trichloride, boron trifluoride or a complex thereof.

As to the conditions such as the polymerization temperature, the polymerization time and the amount of the catalyst used for the polymerization, conditions which are commonly employed for the polymerization of hydrocarbon resins, such as, 10°–100° C., 0.5–6 hours and 0.1–1% by weight relative to the starting materials, may be employed. However, the conditions are not restricted to such ranges.

After the completion of the polymerization reaction, the oil layer containing the polymerization reaction mixture is, by itself or in the presence of a surface active agent, contacted with water or an aqueous alkaline solution, and the aqueous layer is separated, followed by the termination of the polymerization, the removal of the catalyst and the removal of the ash content.

When a surface active agent is used in the above treatment, the amount of the surface active agent is usually from 0.1 to 200 ppm relative to the aqueous layer, but the amount is not restricted to this range.

In the case where water or an aqueous alkaline solution is used as mentioned above, there is no particular restriction as to the amount. However, water or the aqueous alkaline solution is used usually in an amount of from 20 to 200 parts by weight relative to 100 parts by weight of the oil layer.

There is no particular restriction as to the temperature for the removal of the catalyst or for the removal of the ash content. However, it is common to conduct such an operation at a slightly raised temprature within a range of from 50° to 100° C.

By the above operation for the removal of the catalyst and for the removal of the ash content, it is possible to obtain a resin having an adequately low ash content. However, if necessary, the oil phase obtained by the above-mentioned method may further be washed with water in the presence or absence of a surface active agent.

From the oil phase after the operation for the removal of the catalyst and ash content, unreacted oil is distilled off by a conventional method such as distillation, to obtain a liquid hydrocarbon resin. The resin thus obtained, is liquid at room temperature, and is a liquid hydrocarbon resin having a viscosity of from 20 to 50,000 cps (at room temperature) and a hydroxyl value of from 100 to 210.

The liquid hydrocarbon resin obtained by the present invention has very good compatibility when used as an extender, modifier and diluent for epoxy resins, and as compared with a conventional xylene resin, it provides superior bending strength, compressive strength and tensile strength when incorporated in the same amount. In other words, when it is required to provide the same level of properties as in the case where the xylene resin is used, the amount for incorporation can be increased, and thus the resin of the present invention contributes substantially to the economical advantage of the epoxy resin.

Further, the liquid hydrocarbon resin produced by the present invention undergoes a little volatile loss, and brings about no problems from the view point of safety and hygiene.

From the foregoing description, it should be understood that the liquid hydrocarbon resin produced by the present invention is very useful as an extender, modifier and diluent for epoxy resins.

Now, the present invention will be described in further detail with reference to Examples and Comparative Examples. However, it should be understood that the present invention is by no means restricted to these specific Examples.

EXAMPLE 1

In a reactor having an internal capacity of 2 liters, 2 kg of a fraction of a boiling point range of from 140° to 280° C. obtained by the thermal decomposition of a petroleum and containing unsaturated hydrocarbons, was polymerized in the presence of a Friedel-Crafts catalyst (polymerization temperature: 30° C., time: 2 hours) to obtain 1.1 kg of a polymer. This polymer was removed, and 500 g of the unreacted hydrocarbon fraction (unreacted hydrocarbon content: 20% by weight) thereby obtained and 50 g of cresol were charged into a 2 liter reactor. The interior of the reactor was thoroughly flushed with nitrogen, and 2.5 g of a boron trifluoridephenol complex was dropwise added to the mixture over a period of 30 minutes at a reaction temperature of 30° C. under stirring. After the completion of the dropwise addition, the reaction was continued for further 1 hour. After the completion of the reaction, 250 g of a 1 wt % sodium hydroxide aqueous solution and 250 g of xylene were added to the reaction mixture, and the mixture was stirred at 60° C. for 30 minutes, then neutralized and left to stand at 60° C. for 30 minutes. The oil layer and the aqueous layer were separated. Unreacted oil was distilled off from the separated oil layer by steam stripping to obtain a hydrocarbon resin which was liquid at room temperature. The physical properties of the formed resin are shown in Table I.

EXAMPLE 2

The operation was conducted in the same manner as in Example 1 except that 75 g of xylenol was added. The physical properties of the formed resin are shown in Table I.

EXAMPLE 3

The operation was conducted in the same manner as in Example 1 except that 150 g of tar acid was added to 500 g of an unreacted hydrocarbon fraction containing 15% by weight of unsaturated hydrocarbons. The physical properties of the formed resin are shown in Table I.

EXAMPLE 4

The operation was conducted in the same manner as in Example 1 except that 200 g of phenol was added to 500 g of an unreacted hydrocarbon fraction containing 8% by weight of unsaturated hydrocarbons. The physical properties of the formed resin are shown in Table I.

COMPARATIVE EXAMPLE 1

The operation was conducted in the same manner as in Example 1 except that no phenol compound was added. The formed resin was solid at room temperature, and the softening point was 55° C. The physical properties are shown in Table I.

COMPARATIVE EXAMPLE 2

The operation was conducted in the same manner as in Example 1 except that 300 g of tar acid was added. The physical properties of the formed resin are shown in Table I.

EXAMPLES 5 TO 7

An epichlorohydrin-bisphenol epoxy resin (Epikote #828, manufactured by Shell Company), a polyamide amine curing agent (Tormide #245, manufactured by Fuji Kasei Kogyo K.K.) and the product of Example 2 were blended in the proportions as shown in Table II, and the resins thereby obtained were tested for the Shore D hardness, the bending strength, the compressive strength and the tensile strength. The results are shown in Table II.

COMPARATIVE EXAMPLE 3

The epoxy resin and the curing agent were blended in the proportions as shown in Table II, and the resin thereby obtained was tested for the Shore D hardness, the bending strength, the compressive strength and the tensile strength. The results are shown in Table II.

COMPARATIVE EXAMPLES 4 TO 6

The operation was conducted in the same manner as in Example 5 except that a pure m-xylene resin (Nikanol LL, manufactured by Mitsubishi Gas Chemical Company, Inc.) was used instead of the product of Example 2. The results are shown in Table II.

TABLE I

|  | Phenol compound Type/Amount*1 | | Polymer yield (%) | Viscosity*2 (cps) | Color*3 (GI) | Volatile loss*4 (wt %) |
| --- | --- | --- | --- | --- | --- | --- |
| Example 1 | Cresol | 50 g | 35 | 35000 | 12 | 10 |
| Example 2 | Xylenol | 75 g | 30 | 15000 | 14 | 14 |
| Example 3 | Tar acid | 150 g | 29 | 5500 | 15 | 16 |
| Example 4 | Phenol | 200 g | 30 | 1700 | 16 | 12 |
| Comparative Example 1 | — | | 35 | 55° C.*5 | 12 | — |
| Comparative Example 2 | Tar acid | 300 g | 8 | 1200 | >18 | 16 |

*1 Amount relative to 500 g of the feed oil
*2 By B-type viscometer (25° C.)
*3 By Gardner color scale
*4 By JIS K-5400
*5 Softening point by R & B method

TABLE II

| | Proportions | | | | Shore D hardness | | | Bending*1 strength (kg/cm²) | Compressive*1 strength (kg/cm²) | Tensile*1 strength (kg/cm²) |
| --- | --- | --- | --- | --- | --- | --- | --- | --- | --- | --- |
| | Epoxy*2 resin | Curing*3 agent | Product of Example 2 | Xylene*4 resin | 1st day | 4th day | 7th day | | | |
| Comparative Example 3 | 100 | 43 | — | — | 80 | 85 | 85 | 800 | 740 | 530 |
| Comparative Example 4 | 100 | 43 | — | 25 | 50 | 80 | 80 | 300 | 460 | 200 |
| Comparative Example 5 | 100 | 43 | — | 50 | 35 | 60 | 70 | 50 | 230 | 90 |
| Comparative Example 6 | 100 | 43 | — | 75 | — | 50 | 60 | 30 | 170 | 70 |
| Example 5 | 100 | 43 | 25 | — | 70 | 85 | 90 | 770 | 730 | 490 |
| Example 6 | 100 | 43 | 50 | — | 70 | 80 | 85 | 350 | 570 | 270 |
| Example 7 | 100 | 43 | 75 | — | 60 | 75 | 75 | 340 | 550 | 280 |

*1 By JIS K-6911
*2 Epichlorohydrin-bisphenol epoxy resin (Epikote #828, manufactured by Shell Company)
*3 Polyamide curing agent (Tormide #245, manufactured by Fuji Kasei Kogyo K.K.)
*4 Pure m-xylene resin (Nikanol LL, manufactured by Mitsubishi Gas Chemical Company, Inc.)

What is claimed is:

1. A process for producing a liquid hydrocarbon resin which comprises polymerizing, by means of a Friedel-Crafts catalyst, a mixture of (1) a residual polymerized fraction obtained by polymerizing a fraction of a boiling point range of from 140° to 280° C. obtained from the decomposition of a petroleum, said fraction containing aromatic hydrocarbons having 9 carbon atoms, and recovering the resulting residual polymerized fraction, and (2) phenol and/or a phenol derivative.

2. The process according to claim 1, wherein the phenol and/or the phenol derivative is used in an amount of from 10 to 50 parts by weight relative to 100 parts by weight of said residual polymerized fraction.

3. The process according to claim 1, wherein said residual polymerized fraction contains from 5 to 30% by weight of polymerizable unsaturated aromatic hydrocarbons.

4. The process according to claim 1, wherein the phenol derivative is an alkylphenol.

5. The process according to claim 1, wherein the phenol derivative is cresol, xylenol, ethylphenol, isopropylphenol, tert-butylphenol, tert-octylphenol or nonylphenol.

6. The process according to claim 1, wherein the Friedel-Crafts catalyst is an aluminum halide or its complex, boron trifluoride or its complex, or a tin halide.

7. The process according to claim 1, wherein the Friedel-Crafts catalyst is anhydrous aluminum trichloride, boron trifluoride or a complex thereof.

8. The process according to claim 1, wherein the Friedel-Crafts catalyst is used in an amount of from 0.1 to 1% by weight relative to said mixture.

9. The process according to claim 8, wherein the polymerization of said mixture is conducted at a temperature of from 10° to 100° C. for from 0.5 to 6 hours.

* * * * *